US005742263A

United States Patent [19]
Wang et al.

[11] Patent Number: 5,742,263
[45] Date of Patent: Apr. 21, 1998

[54] HEAD TRACKING SYSTEM FOR A HEAD MOUNTED DISPLAY SYSTEM

[75] Inventors: Ynjiun P. Wang; Timothy P. O'Hagan, both of Fort Myers, Fla.

[73] Assignee: Telxon Corporation, Akron, Ohio

[21] Appl. No.: 574,261

[22] Filed: Dec. 18, 1995

[51] Int. Cl.⁶ ................................................ G09G 5/00
[52] U.S. Cl. ........................... 345/8; 345/9; 345/7
[58] Field of Search .......................... 345/8, 7, 9, 127, 345/123, 139; 348/45, 65, 77, 115; 359/631

[56] References Cited

U.S. PATENT DOCUMENTS

| | | | |
|---|---|---|---|
| 4,884,219 | 11/1989 | Waldren | 345/8 |
| 5,322,441 | 6/1994 | Lewis et al. | 345/8 |
| 5,491,510 | 2/1996 | Gove | 345/8 |
| 5,579,026 | 11/1996 | Tabata | 345/8 |
| 5,596,340 | 1/1997 | Otomi | 345/139 |

*Primary Examiner*—Xiao Wu
*Attorney, Agent, or Firm*—Renner, Otto, Boisselle & Sklar, P.L.L.

[57] ABSTRACT

A head mounted display system includes a frame that can be worn on a user's head wherein the frame supports a display and an optical system that projects an enlarged image of video information depicted on the display at a distance from the user. Also mounted on the frame so as to form an integral part of the head mounted display system is a barcode sensor for detecting one or more barcodes in the field of view thereof. A processor of the head mounted display system decodes barcodes detected by the sensor and determines the location of detected barcodes within the sensor's field of view. The processor utilizes the decoded barcode values and locations to control the video information depicted on the display for head tracking purposes or the like. The head mounted display system of the present invention has applications in both augmented field of view and virtual reality applications.

20 Claims, 8 Drawing Sheets

5,742,263

HEAD TRACKING SYSTEM FOR A HEAD MOUNTED DISPLAY SYSTEM

FIELD OF THE INVENTION

The present invention relates to a head mounted display system and more particularly to a head mounted display system with an integral barcode sensor for tracking the position of a user's head and a method of using the system.

BACKGROUND OF THE INVENTION

Known head mounted display systems have utilized head tracking devices to track the movement of a user's head to change the information that is depicted on the display system. For example, in virtual reality applications in which the user is completely submerged in a virtual world and does not see the real world, head trackers are used to sense when the user turns his head to change the video viewed by the user. For example, as the user turns his head in one direction, the video moves in the opposite direction so that the user sees what a camera would see if it panned a scene in the direction that the user is turning his head in. The video thus simulates the view that a user would see if he turned his head in the real world. Other head mounted display systems are used to augment the real world wherein displayed information is superimposed on the real world. In such an augmented system, it is often desired that the displayed information appear to be at a fixed location in the real world. Thus, as a user changes his head position, the displayed information remains in a position that is fixed with respect to the position of stationary, real world objects simultaneously viewed by the user. Although various types of head tracking systems are known, including magnetic position trackers, ultrasonic position trackers, inertial head trackers, etc., these known systems have one or more problems with stray fields, noise, cost and insufficient accuracy.

SUMMARY OF THE INVENTION

In accordance with the present invention, the disadvantages of prior head tracking or head position detectors for a head mounted display system have been overcome. The head mounted display system of the present invention includes an integral barcode sensor for detecting barcodes positioned in the real world so as to be detectable by the barcode sensor for head tracking. The system and method of the present invention is accurate, cost effective and lightweight so as to be extremely suitable for a head mounted system.

More particularly, the head mounted display system of the present invention includes a frame to be supported on a user's head. A display that depicts video information is mounted on the frame as is an optical system for projecting an enlarged image of the displayed video information at a predetermined distance from the user. A barcode sensor is mounted on the frame in a fixed relationship with respect to the display and optical system so that the image detected by the sensor can be mapped onto the displayed image. The barcode sensor detects one or more barcodes in a field of view of the sensor. A processor decodes a barcode detected in the barcode sensor's field of view and the processor controls the video information depicted on the display in accordance with a decoded barcode.

A relatively simple barcode can uniquely identify a particular position in the real world and is easily distinguishable from objects in the real world so as to greatly simplify the detection thereof and the determination of the location of the barcode in the sensor's field of view. The system and method of the present invention are applicable to both augmented reality applications as well as to virtual reality applications.

These and other advantages and novel features of the present invention, as well as details of an illustrated embodiment thereof, will be more fully understood from the following description and drawings.

DESCRIPTION OF THE PREFERRED EMBODIMENT

Figure 1:
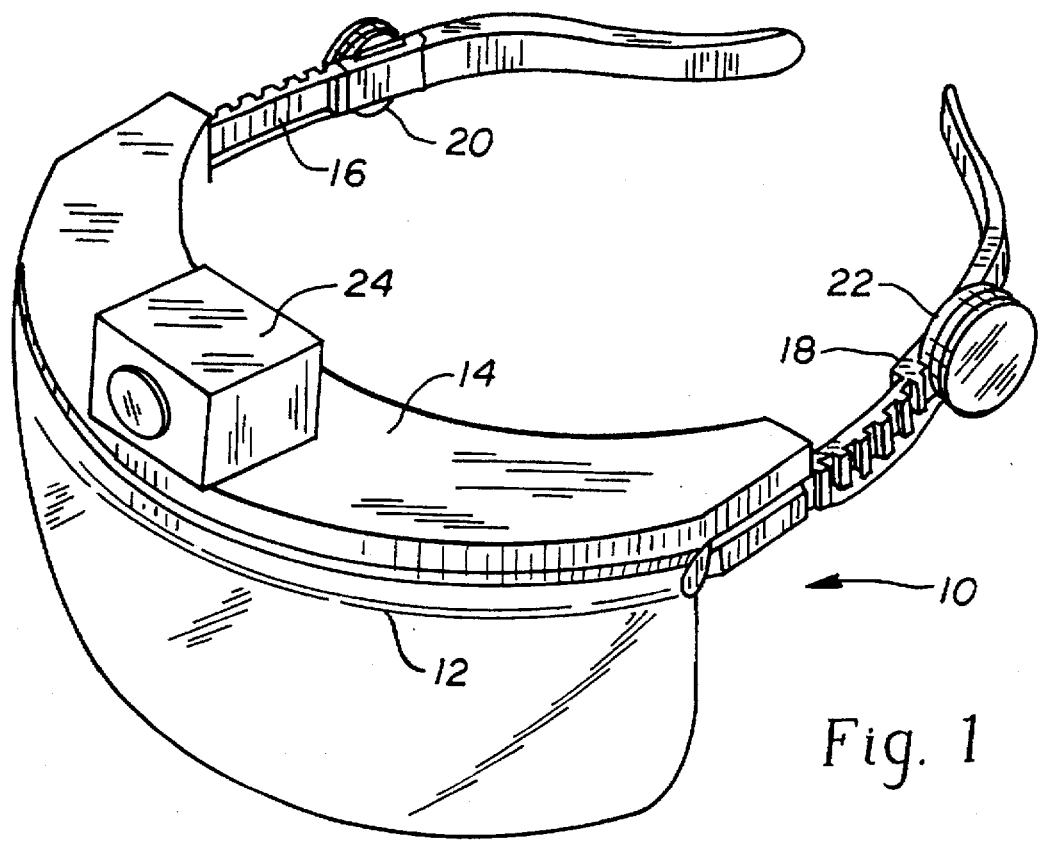
FIG. 1 is a perspective view of a head mounted display system with an integral barcode sensor in accordance with the present invention.

A head mounted display system 10, as shown in FIG. 1, includes a frame 12 with a central portion 14 and a pair of arms 16 and 18 extending rearwardly therefrom so as to support the head mounted display system 10 on a user's head. A pair of earphones 20 and 22 are removably mounted on the arms 16 and 18 to provide audio for the system if desired. The central portion 14 of the frame 12 supports a display, the optical system and a barcode sensor 24 that is employed for tracking the movements of a user's head and/or to detect barcodes so as to cause the video information depicted on the display to change in response to the detection of different barcodes as discussed in detail below.

Figure 2:
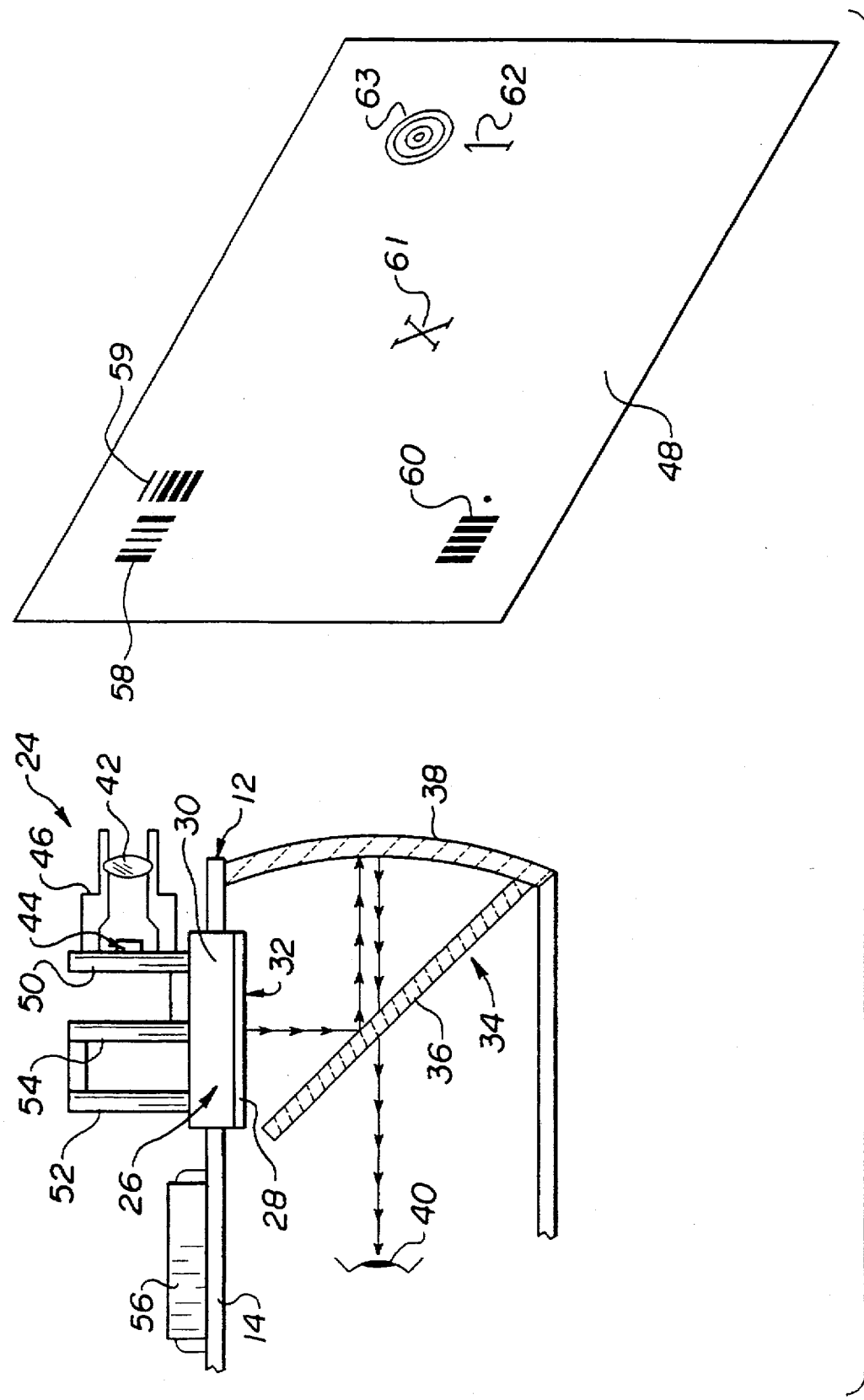
FIG. 2 is a side view of a cross section of the head mounted display system depicted in FIG. 1 illustrating details of the barcode sensor, display and optics thereof as well as an augmented field of view.

More particularly, as shown in FIG. 2, a display 26 that includes a liquid crystal display panel 28 and a back light assembly 30 is fixedly mounted on the central portion 14 of the frame 12 so that the face of the display 32 points downward. The optical system 34 is fixedly mounted on the central portion 14 of the frame 12 in relation to the display 26 so that the image plane is at a fixed distance with respect to the user. Although for virtual reality applications the image plane may be located at infinity, for augmented field of view systems the image plane is preferably located at a distance from the user that is less than infinity. For augmented systems, the image plane is preferably located at a distance at which the user focuses his eyes to perform some type of work for which the head mounted display system is worn. The optical system 34 includes a partially reflective mirror 36 or mirror surface that is supported on the frame 12 at a 45° angle with respect to the display face 32. The optical system 34 also includes a collimating element 38 in the form of a curved lens or the like for projecting an enlarged image of information depicted on the display 26 at a distance from the user. Specifically, the video information depicted on the display 26 is reflected by the partially reflecting mirror 36 onto the collimating element 38 that is also a partial reflector in this embodiment of the optical system. The collimating element 38 reflects the video information through the partially reflective mirror 36 to the user's eye such that the collimating element 38 projects an enlarged image of the displayed information at a distance from the user as viewed by the user through the partially reflective mirror 36. Because the optical elements that are positioned in the direct line of sight of an eye 40 of a user are partially reflective, the image projected by the optical system appears to be superimposed on the real world such that the user views the displayed information and the real world simultaneously.

Also mounted on the central portion 14 of the frame 12 of the head mounted display system so as to be an integral part thereof is the barcode sensor 24. The barcode sensor 24 forms a camera that includes a lens assembly 42 and a photosensor array 44 wherein the housing 46 functions to shroud ambient light from the photosensor array 44. The lens assembly 42 is fixedly mounted in a housing 46 that also supports the photosensor array 44. The lens assembly 42 is employed to focus an image of the field of view 48 of the sensor 24 onto the photosensor array 44. The photosensor array 44 may be formed of an array of photodiodes or the like or preferably is formed of a charge-coupled device (CCD) array having a number of CCD pixel elements. The housing 46 may also support an illumination assembly, not shown, for illuminating the field of view for the sensor 24 so that the photosensor array 44 can clearly capture the image within the sensor's field of view 48. The individual elements of the photosensor array 44 are responsive to incident light so as to provide an output signal in the form of a gray level signal that represents the magnitude of the incident light. Because the incident light is light reflected off of a barcode, a white image has a high gray scale value whereas a black image has a low gray scale value as discussed in detail below. The photosensor array 44 is mounted on a first circuit board 50 that is in turn mounted on the frame portion 14 so that the photosensor array 44 is in a fixed relation with respect to the display 26 and optical system 34. The central portion 14 of the frame 12 also supports additional circuit boards 52 and 54 as well as a microprocessor 56 that forms a controller for the head mounted display system 10 as discussed below.

In operation, the barcode sensor 24 detects barcodes 58–60 that are within the field of view 48 of the sensor 24. The microprocessor 56 is responsive to a detected barcode to decode the detected barcode and to control the information depicted on the display 26. For example in one embodiment of the invention, the microprocessor 56 controls the display 26 to depict human readable information that is associated with a detected barcode wherein a user views the displayed information via the optical system 34. The microprocessor 56 in accordance with another feature of the invention controls the display 26 to vary the location of information, including one or more symbols, depicted on the display in accordance with the location of one or more barcodes that are positioned in the real world and detected by the sensor so as to accurately position a virtual image 61 of a displayed symbol with respect to the detected barcodes in the sensor's field of view. Because the barcode sensor 24 can detect a number of different barcodes simultaneously within its field of view, a projected image of a symbol 61 can be accurately positioned with respect to the barcodes regardless of the angle of the camera i.e. sensor 24 to the barcodes as discussed in detail below. Further, relatively simple barcodes can be employed to identify a large number of unique locations in the real world. Barcode printers are readily available that print quality barcodes detectable by the photosensor array 44 at minimal cost. In addition, the photosensor array 44 can detect alphanumeric characters 62 or symbols 63 other than barcodes as is well known.

Figure 3:
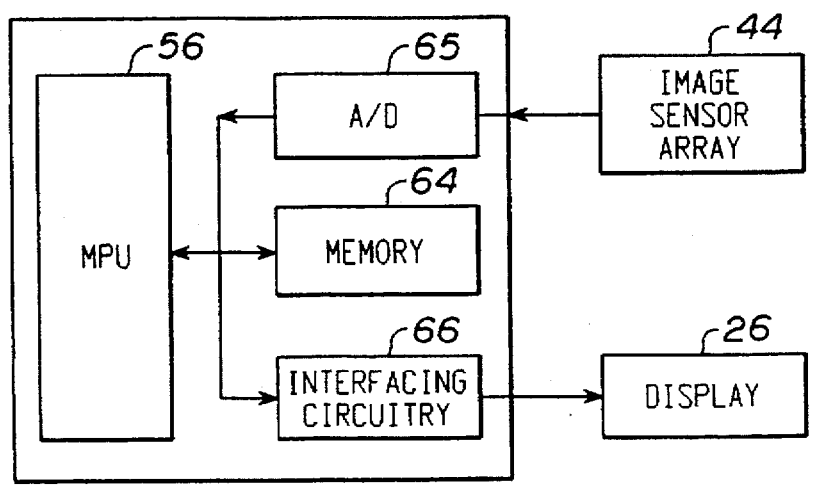
FIG. 3 is a block diagram of the electronic portion of the system depicted in FIG. 2.

As shown in FIG. 3, the microprocessor 56 operates in accordance with software stored in a memory 64. The microprocessor 56 may also utilize a portion of the memory 64 for data manipulation, and temporary storage of photosensor array frame, pixel information as well. The analog gray scale values from the photosensor array 44 representing the detected images within the field of view 48 of the sensor 24 are coupled to an analog to digital converter 65. The analog to digital converter 65 converts the analog gray scale values to digital gray scale values each of which represents a pixel that corresponds to an element of the photosensor array. The gray scale pixel values for a particular frame represent a snapshot of the image sensed by the array 44 at a particular period of time and are temporarily stored in the memory 64. The microprocessor 56 analyzes the gray scale values for a photosensor array frame image so as to decode the barcodes captured in the frame image and to further determine the location of each of the barcodes within the sensor's field of view from the corresponding pixel location within the frame image stored in the memory 64. The microprocessor 56 then utilizes the value of a decoded barcode and/or its location within the field of view of the photosensor array 44 to control the information depicted on the display 26 via interface circuitry 66. For example, the memory 64 may store a table that correlates decoded barcode values with human readable information associated with the barcodes. The microprocessor 56 is responsive to a decoded barcode value to determine the human readable information stored in association therewith in the memory 64 and to control the display 26 to display the human readable information so that it is viewable by a user via the optical system 34. The microprocessor 56 is also responsive to the location of the decoded barcode so as to position the human readable information on the display so that the image thereof when projected by the optical system 34 will appear at a location in association with the position of its correlated, decoded barcode in the real world. It is noted that the microprocessor 56 may be in communication with an auxiliary processing system such as worn or carried by the user or such as a remote host processing system via a wireless or wired arrangement. The auxiliary processing system transmits information representing human recognizable information associated with a detected barcode and/or location information to identify the positioning of symbols on the display with respect to a detected barcode location so that the microprocessor 56 can dynamically respond to detected barcodes.

In accordance with another feature of the present invention, the location of one or more barcodes detected by the photosensor array 44 and determined by the microprocessor 56 are employed for head tracking purposes. For example, the microprocessor 56 positions symbols on the display 26 so that when they are projected by the optical system 34, the symbols appear to be located at a fixed position in the real world with respect to stationary real world objects. The microprocessor 56 accomplishes this by monitoring the location of one or more detected barcodes within the field of view 48 of the photosensor array 44 and as identified by the pixel location of the detected barcode in the frame image stored in the memory 64. When the microprocessor 56 determines a change in the location of one or more of the barcodes within the field of view 48 of the photosensor array 44, the microprocessor 56 identifies a change in the position of the user's head. The microprocessor 56 is responsive to a detected change in the barcode locations so as to vary the location of a symbol depicted on the display 26 by a corresponding amount so that when the symbol is projected by the optical system onto the real world, the symbol appears to be at a fixed location with respect to stationary real world objects as the user changes his head position. Thus, the projected image appears to the user to be a part of the real world as opposed to only a projected image.

Figure 4A:
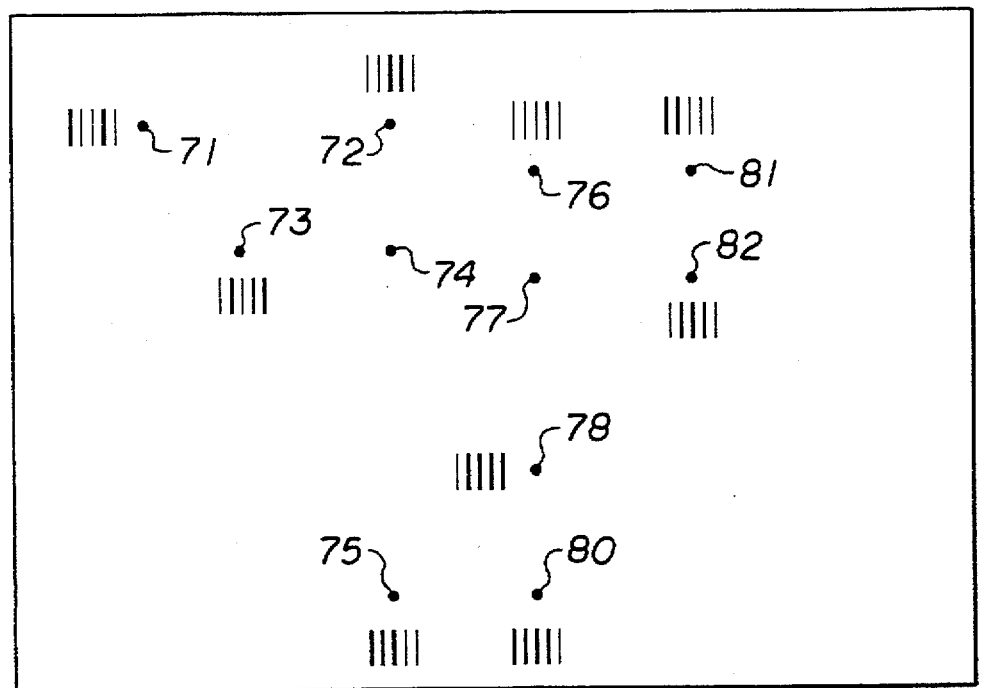
FIG. 4A is an illustration of a real world field of view.
Figure 4B:
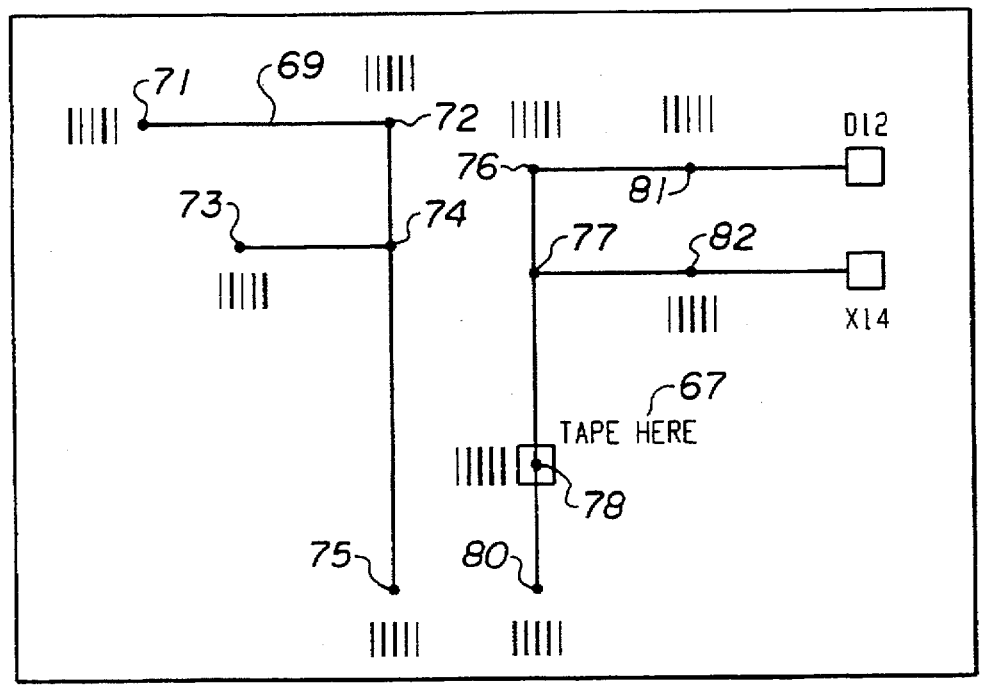
FIG. 4B is an illustration of an augmented field of view for the real world view depicted in FIG. 4A.

The head tracking operation of the present invention has numerous applications in both augmented and virtual reality head mounted display systems. An example of an augmented field of view application is the assembly of a wire harness board 70 as depicted in FIGS. 4A and 4B. As shown in FIG. 4A, the board 70 may have printed thereon a number of barcodes in association with predetermined points 71–82 on the board 70. Preferably, the field of view 48 of the barcode sensor 24 is sufficiently large so as to encompass the entire board 70. Therefore, when a user wearing the head mounted display system as shown in FIGS. 1 and 2 views the board 70, the barcode sensor 24 detects the barcodes labeling each of the points 71–82 on the board 70 to generate a frame image thereof in the memory 64. The microprocessor 56 decodes each of the barcodes detected by the sensor 24 and determines the location of each of the barcodes. Thereafter, the microprocessor 56 controls the display 26 to generate symbols in the form of wire routing lines on locations of the display 26 such that when the user views the displayed image of the lines through the optical system 34, the image 69 of the wire routing lines appears in the proper position with respect to the points 71–82 on the board 70. Specifically, the image 69 of the wire routing lines appears to connect the points 71–82 in a desired pattern which the user of the system 10 follows to wire the board 70. The microprocessor may also control the display 26 to depict connection points and the labels therefore such as D12 and X14 as well as alphanumeric instructions 67 for the user.

Figure 5A:
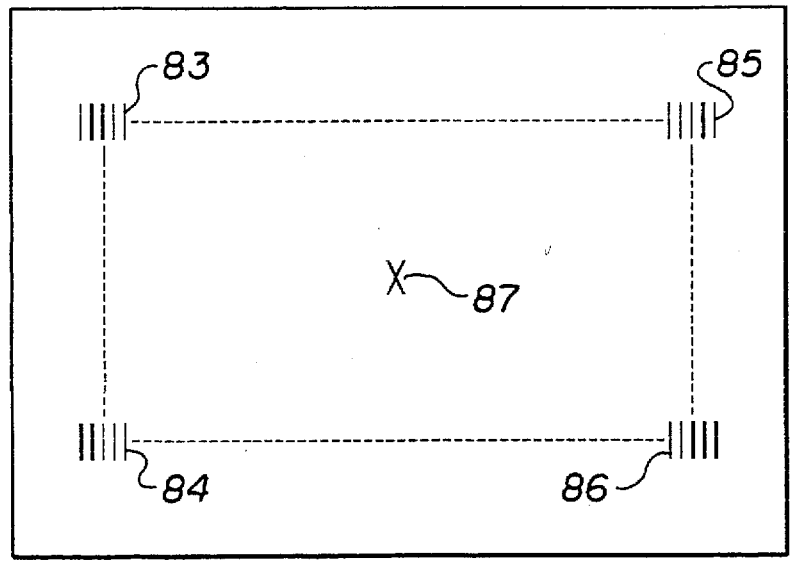
FIG. 5A is an illustration of an augmented field of view relative to a barcode sensor angle that is not skewed.
Figure 5A:
Figure 5B:
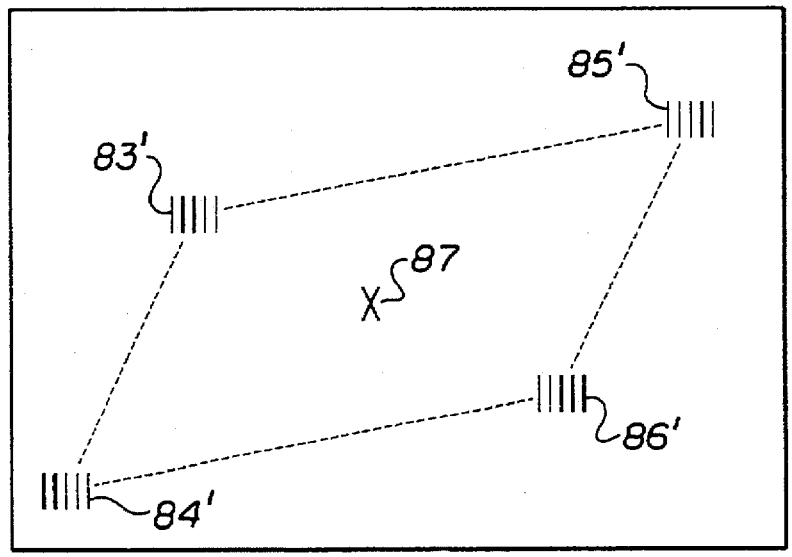
FIG. 5B is an illustration of an augmented field of view relative to a barcode sensor angle that is skewed.
Figure 5B:
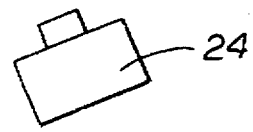

It is noted that because the photosensor array 44 is mounted on the frame 12 of the head mounted display system in a fixed relationship with respect to the display face 32 and the optical system 34, the pixel location of the detected barcodes in the frame image stored in the memory 64 can be mapped onto corresponding pixel locations of the display 26 so that when projected by the optical system 37, the projected virtual image of the displayed information is projected at a precise location in the real world. Further, because the field of view 48 of the barcode sensor 24 is sufficiently large so as to detect a number of barcodes positioned therein, the projected image of displayed symbols can be accurately positioned with respect to real world objects regardless of the skew angle of the camera or sensor 24 with respect to the barcodes. Specifically, it may be desirable to center a symbol 87 between the four barcodes 83–86 as shown in FIG. 5A with respect to a non-skewed angle of the camera or sensor 24 with respect to the barcodes. If the angle of the sensor 24 becomes skewed with respect to the position of the barcodes in the real world as depicted in FIG. 5B, the frame image of the detected barcodes may show the barcodes at skewed locations 83'–86'. The microprocessor 56 is responsive to the determined locations 83'–86' of the detected barcodes and software indicating that the symbol 87 should be centered therebetween to perform a simple mathematical operation to determine the exact location of the symbol 87 on the display 26. For example, the microprocessor 56 determines the intersection point of a first line extending between locations 83' and 86' and a second line extending between locations 84' and location 85' to determine the location of the symbol 87 with respect to the detected barcodes. After determining the location of the symbol 87 with respect to the pixel locations of the frame image of the barcodes in the memory 64, the microprocessor 56 maps that location to the corresponding location on the display 26 so that when the symbol is displayed at the determined location on the display 26 it will be projected by the optical system 34 at the correct location with respect to the barcodes viewed in the real world by the user whose head is at an angle with respect to the barcodes as depicted in FIG. 5B.

The microprocessor 56 operates in accordance with the flow charts depicted in FIGS. 6A and 6B to control the information depicted on the display 26 in response to the determined location of a detected barcode and the decoded value of a detected barcode as follows. At a block 90, the microprocessor 56 initializes a pointer X by setting it to 1. Thereafter, at block 91, the microprocessor 56 locates a first barcode in the field of view of the photosensor array 44 by evaluating the gray scale value information obtained from the array 44 that is stored as a frame image in the memory 64 and the pixel locations of those grey scale values. After locating a barcode within the sensor's field of view, the microprocessor at a block 92 decodes the barcode as discussed in detail below by determining the precise location of the transitions between a white background and an edge of a black bar of the barcode. At block 93, the microprocessor 56 stores a decoded value and location for the detected barcode in accordance with a sample time so that it can be compared to decoded values and locations for barcodes detected at a subsequent sample time. After storing the determined information, the microprocessor 56 proceeds to block 94 to determine whether there are any more barcodes detected within the field of view of the sensor 24. If so, the microprocessor 56 proceeds to block 95 to increment the pointer X by one, the microprocessor thereafter returning to block 91 to locate and decode the next barcode detected within the sensor's field of view. After decoding and locating each of the barcodes within the sensors field of view, the microprocessor 56 exits the subroutine of FIG. 6A at block 96.

Figure 6B:
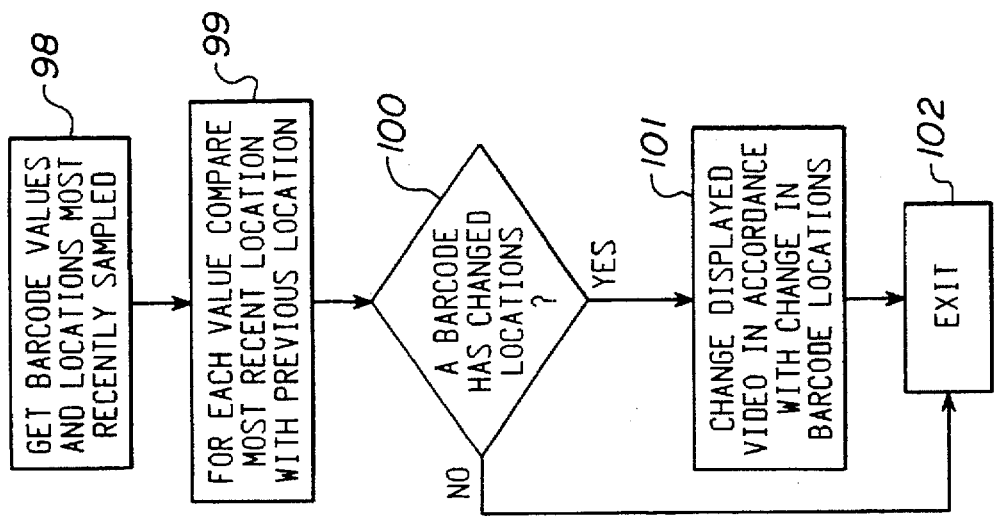
FIG. 6B is a flow chart illustrating a head tracking scheme.
Figure 6A:
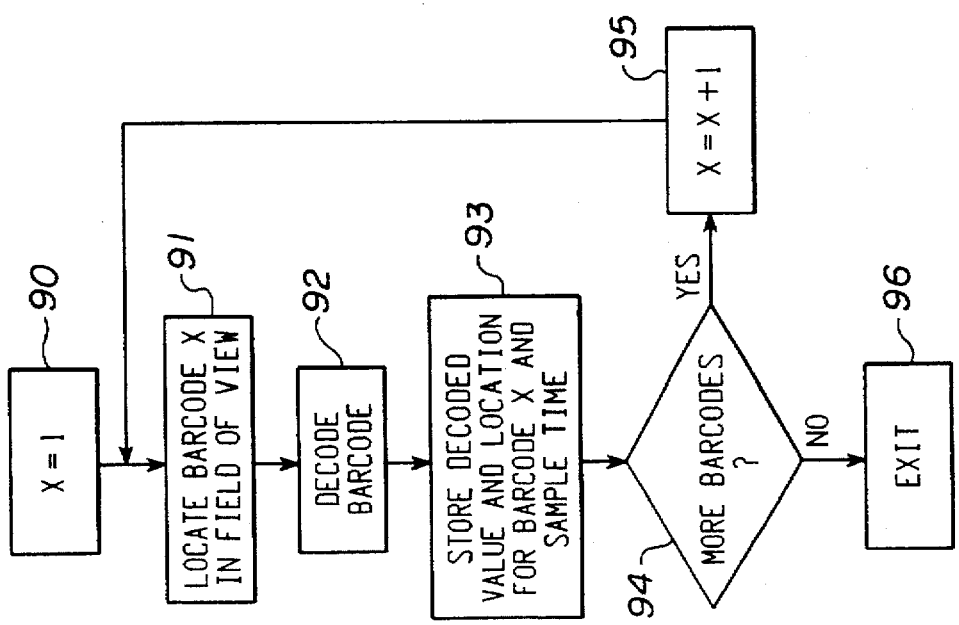
FIG. 6A is an illustration of a flow chart for identifying barcodes in the barcode sensor's field of view.

As shown in FIG. 6B, in order to implement head tracking, the microprocessor 56 at a block 98 obtains barcode values and their associated locations within the sensor's field of view for the most recently sampled frame image. Thereafter, at a block 99, the microprocessor 56 compares the barcode location obtained at block 98 to the locations determined for an immediately preceding frame image for each of the decoded barcode values. At block 100, the microprocessor 56 determines whether one or more of the detected barcodes has changed its location indicating a change in the position of the user's head with respect to the position of the barcodes in the real world. If the microprocessor does determine that at least one of the barcodes has changed its location within the sensor's field of view, the microprocessor proceeds from block 100 to block 101. At block 101, the microprocessor 56 changes the displayed video in accordance with the change in barcode locations. In augmented field of view systems, the microprocessor at block 101 changes the position of symbols depicted on the display 26 so that as the user changes the position of his head, the image of the displayed symbols appears to be fixed with respect to stationary objects in the real world. For virtual reality applications, in which the user is completely submerged in the displayed video, the microprocessor 56 may change the displayed video so as to reflect a change in the position of the user's head. For example, if the user turns his head to the right, the microprocessor controls the video information depicted on the display to move to the left with new information coming into view on the right so that the user perceives that which he would perceive by turning his head to the right in the real world i.e. for example a view that a camera would see if it were panned to the right. All that is needed in accordance with the present invention for virtual reality applications is to position one or more barcodes in the real world environment in which the user is employing the head mounted display system such that the barcodes are detectable by the barcode sensor 24. These are just a few examples of applications for the system and method of the present invention.

It should be appreciated that in implementing this invention it is desirable for the barcode sensor to have a wide field of view. Therefore, each barcode will image onto a small area of the photosensor and it is quite possible that the smallest bars and spaces will image onto fewer than two pixels. Therefore, a sub-pixel processing decoding system as depicted in FIGS. 7–13 is useful.

Figure 7:
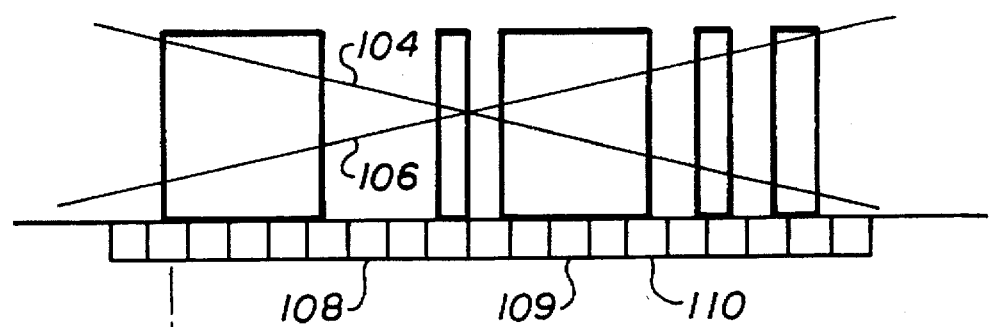
FIG. 7 is an illustration of a barcode with respect to a line of pixel elements of the barcode sensor.

The microprocessor 56 decodes a barcode as depicted with respect to FIGS. 7–13. A barcode image as shown in FIG. 7 is processed by analyzing one or more of sampling lines such as shown at 104 and 106 that extend at an oblique angle through the barcode wherein each of the sampling lines is represented by a sequence of gray scale values stored for each of the pixels in the frame image along the line. The pixel locations in the frame image serve to identify the location of a barcode with respect to the field of view of the barcode sensor 24 so that the location of the barcode can be mapped onto the display 26 since it is mounted on the frame 12 in a fixed relationship with the barcode sensor 24.

For purposes of illustration, FIG. 7 shows a simple sequence of bars of a barcode and an adjacent representation of a line of pixel positions or CCD sensor element positions through which the sample line 104 extends. It will thus be appreciated that the pixel position 108 receives illumination reflected from a high reflectance white region of the barcode, the pixel position 109 receives illumination reflected from a low reflectance black region and the pixel position 110 receives an intermediate level of illumination from a black/white region representing a bar edge transition. When digitized and stored in the memory 64 as gray scale values, the pixel position 108 is represented as a high gray scale value, the pixel position 109 is represented as a low gray scale value and the pixel position 110 is represented as an intermediate gray scale value.

Figure 8:
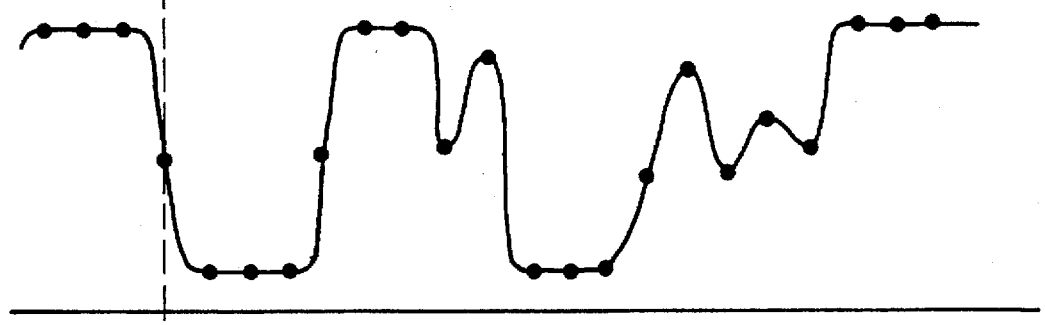
FIG. 8 is an illustration of a plot of gray scale values detected by the pixel elements for the barcode of FIG. 7 without the presence of noise.

FIG. 8 shows an ideal gray scale plot of the barcode of FIG. 7 without noise. The FIG. 8 gray scale plot requires sub-pixel processing because, as shown, the smallest bars are narrower than two pixels in width. In FIG. 7 each bar edge transition represents a transition from black to white or white to black. In FIG. 8 each bar edge transition is represented by a transition segment (illustrated as a line segment) transitioning from a higher gray scale value (e.g., white) to a lower gray scale value (e.g., black) or vice versa. In addition to transitions from black to white and white to black, there are included transitions between higher and lower intermediate gray scale values (e.g., gray to gray) and transitions between gray and white or gray and black gray scale values.

Each transition segment can be considered as extending between a local maximum and a local minimum ("local" because the maximum for a given segment may represent an intermediate gray scale value less than white, for example). The local maximum and local minimum represents adjacent peak and trough gray scale values and can be in a peak to trough sequence, or vice versa. In FIG. 7 there are 10 bar edge transitions. In FIG. 8, in the absence of noise, each of the 10 transition segments represents a valid cell edge transition. As illustrated, each high reflectance space plots as a peak and each low reflectance bar plots as a trough.

Certain characteristics of the gray scale peaks and troughs (maximum and minimum gray scale values) are particularly significant as follows. If a space is wide enough to cover several pixel positions, the peak is wide and flattens at the white gray scale value. Similarly, a wide bar is represented by a wide flat-bottomed trough at the black gray scale value in FIG. 8. If a space is narrower than two pixels wide, then the peak will be narrower than two pixels. More specifically, for narrower spaces the height of the peak may only reach an intermediate gray scale value rather than a white value, as noted.

Figure 9:
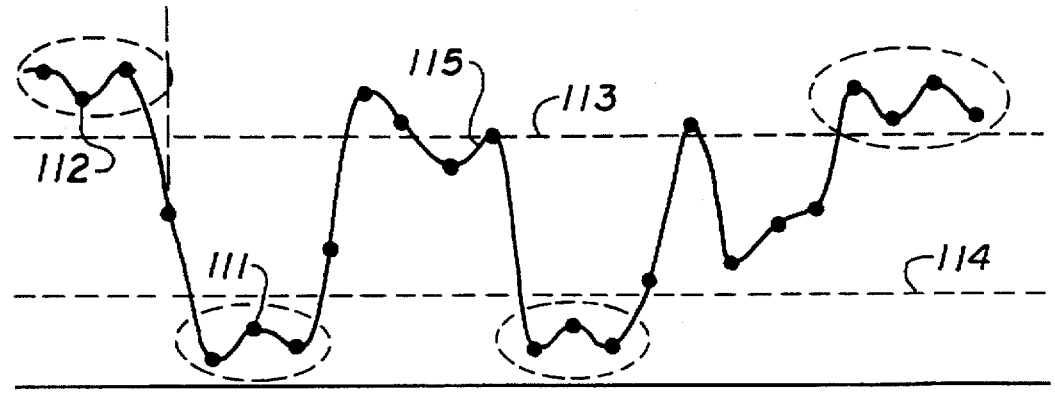
FIG. 9 is an illustration of a plot of gray scale values detected by the pixel elements for the barcode of FIG. 7 in the presence of noise.

In FIG. 9, random noise has been introduced to the FIG. 8 plot producing a gray scale plot including 19 transition segments. Since FIG. 7 includes only 10 bar edge transitions, the FIG. 9 transition segments in excess of that number are false transition segments. However, the following additional characteristics can be recognized. First, if a peak (or trough) is more than two pixels wide, there are pixel positions along the top of the peak (or bottom of the trough) whose gray scale value can be changed by noise to result in introduction of false peaks or troughs, or both. A false peak has thus been introduced at 111 and a false trough at 112. Second, if a peak (or trough) is two pixels or less in width, noise can distort the maximum (or minimum) gray scale value but cannot add a new peak or trough. Because transition segments representative of bar edge transitions are represented by line segments between successive local maximum and local minimum gray scale values (or vice versa), for peaks or troughs two pixels or less in width noise cannot result in the addition of a new transition segment. Also, if there are a series of bars and spaces each one two pixels wide, each bar and space will plot as a single peak or trough, regardless of the presence of noise or the magnitude of such noise.

Thus, false transition segments produced by noise can only be present within high and low ranges of gray scale values. Accordingly, a noise margin is employed so that small transition segments present in such high and low gray scale ranges are treated as not representing actual bar edge transitions. The noise margin is not applied to small transition segments where a peak or trough is present in the intermediate gray scale region (i.e., between the high and low ranges). Since noise cannot create false transition segments outside of the high and low gray scale ranges, each transition segment in the intermediate gray scale region is considered an information bearing transition representing a bar edge transition. High and low gray scale ranges for this purpose may be designated on a predetermined or trial and error basis for use with barcodes of a particular type (e.g., having known characteristics). The ranges may also be actively determined by histogram analysis. In FIG. 9 the high range may be considered as extending from pure white to the gray scale value represented by line 113, with the low range from black to the line 114 gray scale value. With these ranges, a noise margin is effective to cause the transition segments emanating from the noise-modified gray scale values 111 and 112 (as respective false local minimum and maximum values) to be treated as false segments, without restricting transition segment 115 from being processed as representing an actual bar edge transition.

Figure 10:
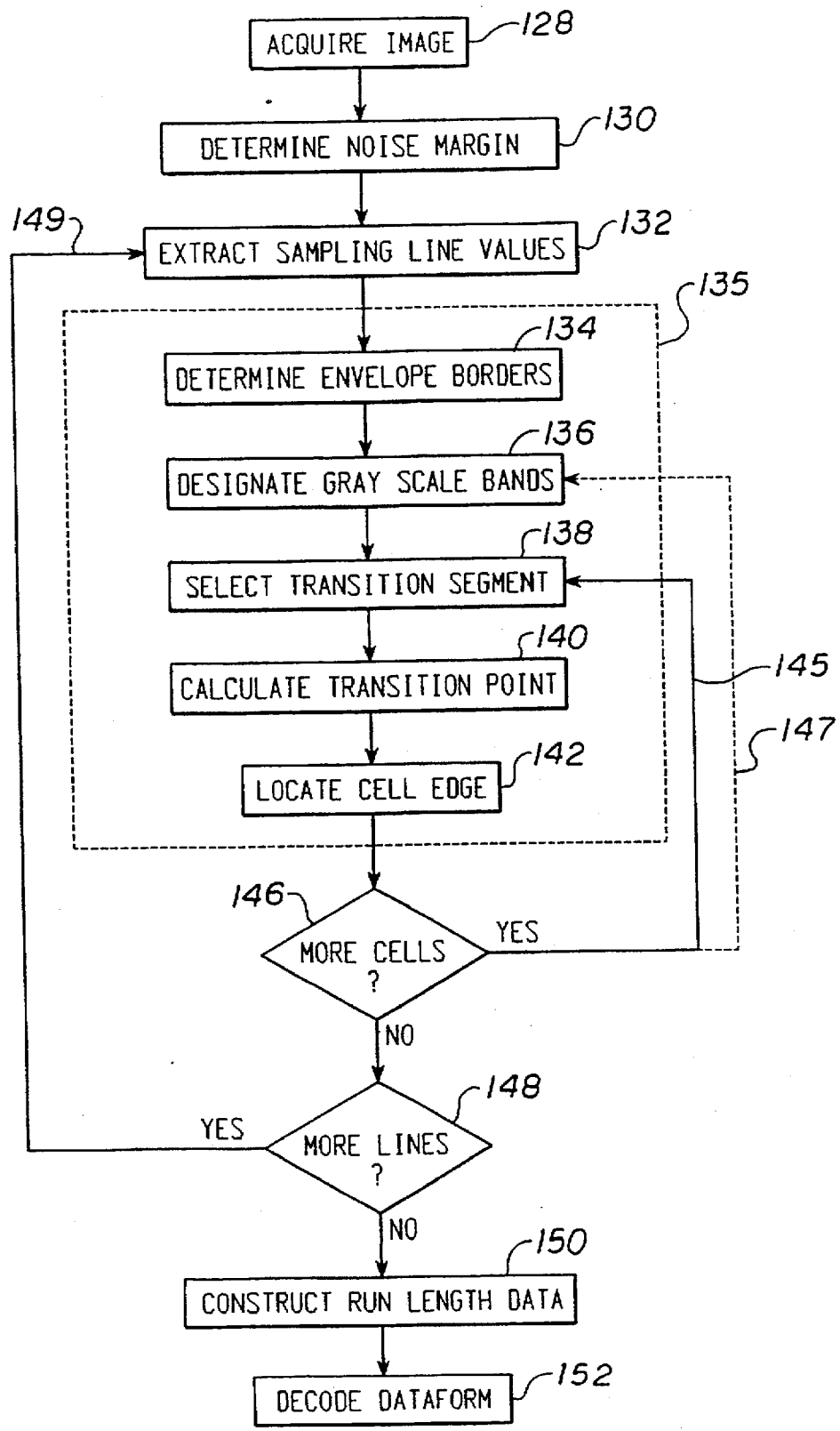
FIG. 10 is a flow chart illustrating the operation of the processor depicted in FIG. 3 in decoding a barcode dataform.
Figure 11:
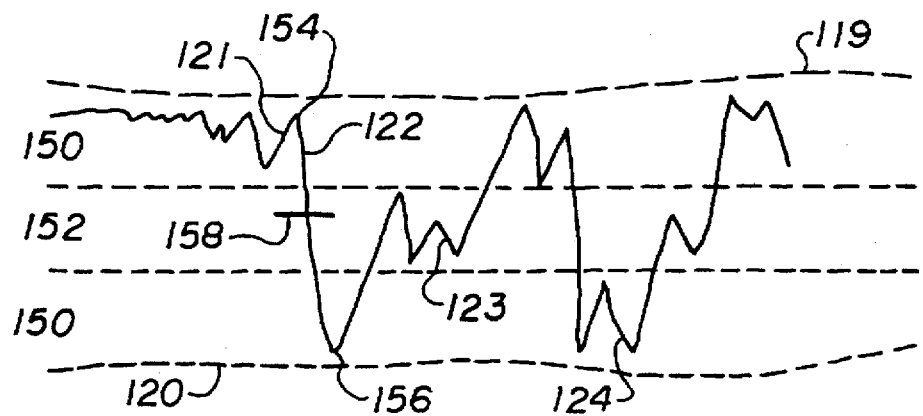
FIG. 11 is an illustration of gray scale values for a barcode with noise discrimination.

FIG. 10 is a flow chart that depicts a barcode edge transition location method for sub-pixel processing of an image of the field of view of the camera or sensor 24. First, a frame image including one or more detected barcodes is stored by the microprocessor 56 at block 128 and the noise margin is determined at block 130. A sampling line 104, 106 of gray scale values is then extracted from the stored image data at block 132 by the microprocessor. At block 134 the upper and lower envelope borders are estimated by the microprocessor 56 and updated for the sequence of gray scale values for the sampling line just extracted. FIG. 11 represents a portion of the gray scale value sequence on a horizontally expanded scale. In this example the portion is one of a series of window portions comprising the full sequence. As shown, the upper and lower envelope borders are indicated at 119 and 120. Preferably, a window portion is selected to include gray scale values for a limited number of bars and/or spaces of a barcode. In this manner, the sampling line will comprise a series of window portions with envelope borders determined individually for each window portion. As a result the envelope borders are dynamically determined for successive windows, providing high resolution.

It is noted that a change in the level of reflected illumination representing a black to white, or white to black, bar edge will result in a change in gray scale values along a sampling line. FIG. 11 shows a sequence of gray scale values connected by transition segments, representative examples of which are identified at 121, 122, 123 and 124. As already discussed, it has been found that for bars of a barcode of small dimensions in the presence of noise, small transition segments may represent either actual bar edge transitions or spurious gray level variations attributable to noise effects. Thus, transition segment 122 is large enough not to be attributable to noise. However, transition segments such as those shown in 121, 123 and 124, have a smaller magnitude comparable to the magnitude of spurious effects attributable to noise. High resolution decoding can be achieved by utilizing a noise margin as discussed above to characterize small transition segments occurring at relatively high or low gray scale values as attributable to noise. The noise margin is, however, selectively utilized so that while transition segments such as 121 and 124 are treated as false, transition segments such as 122 and 123 are treated as valid and processed in order to locate bar edge transitions.

More particularly, for the individual window portion of FIG. 11, at block 136 of FIG. 10, the noise margin is implemented by the microprocessor 56 dividing the gray scale range between the upper and lower envelope borders into three horizontal bands. For example, a ratio of 2 to 1 may be used with each of the outer bands 150 twice as wide as the central band 152. With this ratio the width of bands 150 will each be 40 percent and band 152 will be 20 percent of the overall width between the upper and lower envelope borders 119 and 120. As a result, as the width (i.e., range of gray scale values) between the envelope borders changes for different window portions of a sampling line, the widths of the bands 150 and 152 will be dynamically adjusted for each window section during sub-pixel processing. Thus, at block 136 transition segments such as 121 and 124 which fall within the upper or lower bands 150 are subject to the noise margin and are discarded or disregarded by the microprocessor 56 as spurious effects if the transition segment magnitude falls below the noise margin. Transition segments such as 122 which have a magnitude greater than the noise margin are treated by the microprocessor 56 as representative of actual bar edge transitions, as are segments such as 123 that are contained within the central band 152. Thus, transition segments falling within one of outer bands 150 are treated as spurious if they fall below the noise margin, but transition segments falling within central band 152 are processed, regardless of magnitude.

At block 138, a first transition segment extending between two successive gray scale values is selected by the microprocessor 56, subject to the block 136 noise margin as implemented in the context of outer bands 150, as discussed above. Thus, the transition segment 122 may be selected by the microprocessor 56 for purposes of block 138. As shown, the transition segment 122 extends between gray scale end point values 154 and 156, that may respectively be referred to as local maximum and local minimum values.

Figure 12:
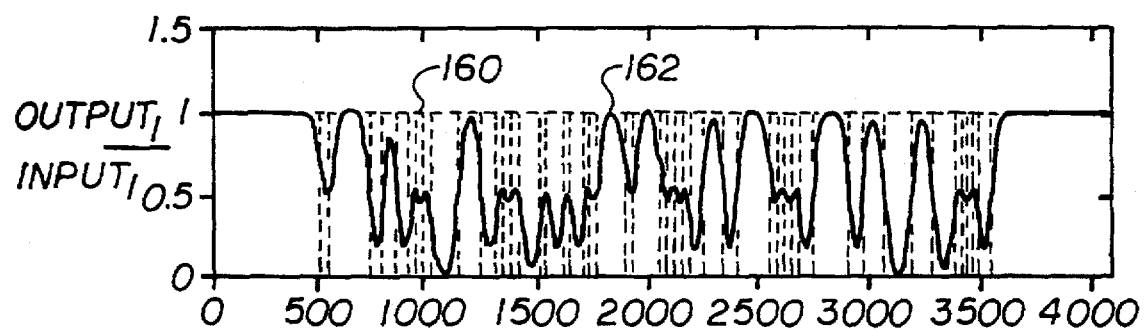
FIG. 12 is an illustration of a waveform obtainable utilizing a Gaussian convolution model with point sampling techniques.

At block 140, an adaptive transition point is determined along transition segment 122 as a function of its end point gray scale maximum and minimum values 154 and 156. The adaptive transition point represents the location of the relevant bar edge transition relative to the inclined length of the transition segment. In accordance with the invention, during sub-pixel processing an adaptive transition point is calculated for each transition segment selected as representative of a bar edge transition. In a currently preferred embodiment, the adaptive transition point for each bar edge transition is calculated based upon a Gaussian convolution model. The gray scale pixel values along a sampling line can be modeled as the samples of an input signal with step edges passing a linear system with a Gaussian impulse response. In FIG. 12, an example of the input and output of a particular sampling line is illustrated, with the Gaussian convolution kernel width (typically designated σ) set at 1.1 pixels and the barcode module width (minimum bar width) set at 1.5 pixels. The input signal 160 (dashed lines) results in the output 162 (solid line) upon application of the Gaussian convolution model utilizing known techniques. Application of the Gaussian convolution model may also use integrated or point sampling techniques to obtain the output in a form similar to that shown in FIG. 12. The Gaussian convolution model accounts for convolution of the optical system and sensor, with the model assimilating these components into processing of the gray scale pixel values along the sampling line. For a transition segment representing a valid edge transition, the adaptive transition point in a preferred embodiment may be calculated using the following relationship that fits the Gaussian model:

$$a=8+10*((MAX+MiN)-(U+L))/(U-L) T=a*MIN+(16-a)*MAX$$

Where MAX is the local maximum value, MIN is the local minimum value, U is the upper envelope border value, L is the lower envelope border value, and T is the transition point.

With reference to FIG. 11 the local maximum and minimum values for transition segment 122 are indicated at 154 and 156 with the adaptive transition point shown at 158. For a range of convolution kernel widths and barcode module widths of interest, this transition point can be fit into a linear function of the local maximum 154 and local minimum 156 for a single edge, and the minimum and maximum of the output of the barcode dataform elements having the greatest width. In general, the separation width between a pair of rising and falling transition segments representing edges in wider barcode patterns is much larger than the convolution kernel width. The minimum and maximum of the response relative to wide barcode patterns are thus the upper and lower envelope borders of the signal waveform of the sequence of gray scale values.

The Gaussian convolution model uses the middle point between the relevant upper and lower envelope borders of the signal envelope and the minimum/maximum gray scale values (156 and 154 for transition segment 122) as input parameters. As noted, in FIG. 11, the transition point as determined for transition segment 122 is represented at position 158 along the segment between points 154 and 156. As thus determined, threshold 158 will typically not be at the midpoint between points 154 and 156. In this manner, dynamic transition point determination is provided by calculating a transition point for each transition segment selected as representing a bar edge transition.

Figure 13:
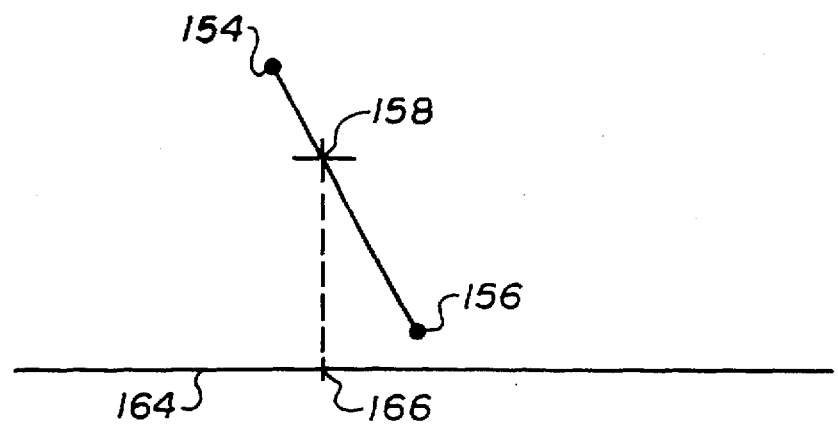
FIG. 13 is an illustration of a linear interpolation plot utilized to identify bar edge transitions in a barcode.

After determination of the adaptive transition point for transition segment 122, at block 142 the relevant bar edge is located by the microprocessor 56. A linear interpolation is used as illustrated in FIG. 13. Thus, the first bar edge transition in this example is located along the sampling line (represented by line 164 in FIG. 13) at a position 166 corresponding to the point of intersection of the vertical projection of transition point 158 with line 164. As discussed, 154 and 156 represent two pixel positions along the sequence of gray scale values, that represent a sampling line across the barcode image. Point 166 thus indicates the location of the first bar edge transition processed in this example.

At block 146, a determination is then made by the microprocessor 56 as to whether there are additional bar edge transitions to be located along the first sampling line. If so, steps 138 and 142 are repeated (by activation via path 145) for each remaining bar edge transition to be located along this sampling line. If additional bar edge transitions remain to be located, it will be apparent from the description above that the next such bar edge transition may be represented by a transition segment between gray scale values which lie along the sampling line at pixel positions beyond the particular window section represented in FIG. 11. If so, in going to the next window section, action will be implemented, via path 147, to newly determine envelope borders and designate gray scale bands for purposes of noise margin implementation at blocks 134 and 136, before proceeding with the location of additional bar edge transitions, via blocks 138, 140 and 142, as described above. It will be understood that in some applications it may be adequate to determine envelope borders once for a complete sampling line, without implementation of a series of window sections.

At block 148, the microprocessor 56 determines whether bar edge transitions are to be located with reference to a second sampling line across the barcode dataform image. If so, blocks 132 through 146 are repeated (by activation via path 149) for each remaining sampling line.

At block 150 run length data is constructed to represent bar edge transitions of the barcode. Run length data may be in the form of a series of numerical values representing the widths of the bars and spaces such as the well known X-sequence or T-sequence. At block 152 the run length data is utilized to decode the dataform using standard decoder software for the chosen barcode format.

Many modifications and variations of the present invention are possible in light of the above teachings. For example, optical systems different from the optical system 34 may be employed in accordance with the present invention. Different barcode decoding methods may be employed as well. Thus, it is to be understood that, within the scope of the appended claims, the invention may be practiced otherwise than as described hereinabove.

What is claimed and desired to be secured by Letters Patent is:

1. A head mounted display system comprising:

a frame to be supported on a user's head;

a display for depicting video information, said display being mounted on said frame;

an optical system mounted on said frame with respect to said display for projecting an enlarged image of said video information depicted on said display at a distance from said user;

a barcode sensor mounted on said frame for detecting one or more barcodes in a field of view of said sensor; and a processor for decoding a barcode detected in said barcode sensor's field of view, said processor controlling the video information depicted on said display in accordance with a decoded barcode.

2. A head mounted display system as recited in claim 1 wherein said processor includes a memory for storing information related to a barcode, said processor being responsive to a decoded barcode for displaying information related to said decoded barcode as stored in said memory.

3. A head mounted display system as recited in claim 1 wherein said processor identifies the location of a barcode in said barcode sensor's field of view and determines whether the location of said barcode changes to vary the location of video information depicted on said display in accordance with the change in the location of said barcode.

4. A head mounted display system as recited in claim 3 wherein said optical system includes a partially transparent reflector for superimposing displayed information, including at least one symbol, on the real world and said processor changes the location of said symbol on said display so that it appears to be at a fixed location in the real world in response to a determined change in the location of said barcode.

5. A head mounted display system as recited in claim 4 wherein the location of said barcode sensor, said display and the optical system are fixed and said processor maps a location in said barcode sensor field of view onto a display position of said display to superimpose said symbol at a desired location with respect to the real world.

6. A head mounted display system as recited in claim 1 wherein said sensor includes a charged-coupled device image sensor array.

7. A head mounted display system comprising:

a frame to be supported on a user's head;

a display for depicting video information, said display being mounted on said frame;

an optical system mounted on said frame with respect to said display for projecting an enlarged image of said video information depicted on said display at an apparent location that appears to be at a distance from said user;

a barcode sensor mounted on said frame for detecting one or more barcodes in a field of view of said sensor, said display, optical system and barcode sensor being mounted on said frame at fixed locations with respect to each other such that a predetermined position on said sensor corresponds to a predetermined position on said display and to a predetermined position on said image of said display at said apparent location; and a processor for decoding a barcode detected in said barcode sensor's field of view and determining the location of said detected barcode in said sensor's field of view, said processor controlling the location of information depicted on said display in accordance with the determined location of said detected barcode in said sensor's field of view.

8. A head mounted display system as recited in claim 7 wherein said optical system includes a partially transparent reflector for superimposing displayed information, including at least one symbol, on the real world and said processor changes the location of said symbol on said display in response to a determined change in the location of said barcode so that the symbol appears to be at a fixed location with respect to a stationary real world object.

9. A head mounted display system as recited in claim 7 wherein said processor includes a memory for storing information associated with a plurality of barcodes, said processor being responsive to a decoded barcode to display information stored in said memory in association with said decoded barcode at a location on said display determined in accordance with the location of said decoded barcode.

10. A head mounted display system as recited in claim 7 wherein said barcode sensor detects a plurality of barcodes in a field of view of said sensor and said processor controls the location of information depicted on said display based on the determined locations of a plurality of said barcodes in said sensor's field of view.

11. A head mounted display system as recited in claim 7 wherein said sensor includes a charged-coupled device image sensor array.

12. A head mounted display system comprising:

a frame to be supported on a user's head;

a display for depicting video information including a symbol at a location on said display, said display being mounted on said frame;

an optical system mounted on said frame with respect to said display, said optical system including a collimating element for projecting an enlarged image of said displayed information at a distance from said user and a partial reflector through which said user views said enlarged image so that it is superimposed on the real world;

a barcode sensor mounted on said frame for detecting one or more barcodes in a field of view of said sensor; and a processor responsive to said barcode sensor for determining a change in a location of a detected barcode to vary the location of said symbol on said display in accordance with said change in the detected barcode's location so that the symbol appears to be at a fixed location with respect to stationary real world objects.

13. A head mounted display system as recited in claim 12 wherein said processor is responsive to a detected barcode to decode said barcode and said processor includes a memory for storing information associated with a plurality of barcodes, said processor being responsive to a decoded barcode to display information stored in said memory in association with said decoded barcode at a location on said display determined in accordance with the location of said decoded barcode.

14. A head mounted display system as recited in claim 12 wherein said barcode sensor detects a plurality of barcodes in a field of view of said sensor and said processor controls the location of said symbol depicted on said display based on the determined locations of a plurality of said barcodes in said sensor's field of view.

15. A head mounted display system as recited in claim 12 wherein said sensor includes a charged-coupled device image sensor array.

16. A method for tracking the position of a user's head in a head mounted display system having a frame for supporting a display depicting video information and optics that project an enlarged image of said video information that appears to be at a location in the real world at a distance from the user, said method employing at least one detectable barcode positioned in the real world and comprising:

detecting a barcode in the field of view of a barcode sensor mounted on said frame of said head mounted display system;

determining a location of a detected barcode in said sensor's field of view.

determining a change in said barcode's location in said sensor's field of view;

varying the position of information depicted on said display in accordance with a change in said barcode's location.

17. A method for tracking the position of a user's head in a head mounted display system as recited in claim 16 including the steps of decoding a barcode and controlling said display to depict different information for different decoded barcodes.

18. A method for tracking the position of a user's head in a head mounted display system having a frame for supporting a display depicting video information and optics that project an enlarged image of said video information that appears to be at a location in the real world at a distance from the user, said method employing at least one detectable barcode positioned in the real world and comprising:

detecting a plurality of barcodes in a field of view of a barcode sensor mounted on said frame of said head mounted display system;

decoding each of said detected barcodes;

determining a location of each of said barcodes in said sensor's field of view;

determining a change in at least one of the locations of said barcodes; and varying the position of information depicted on said display in accordance with the changes in the barcodes' locations.

19. A method for tracking the position of a user's head in a head mounted display system as recited in claim 18 including the step of controlling said display to depict different information in association with the location of each of said different barcodes.

20. A method for varying information depicted on a head mounted display system having a frame for supporting a display depicting video information and optics projecting an enlarged image of said video information, said image appearing to be located at a distance from the user in the real world, said method employing at least one detectable barcode positioned in the real world and comprising:

storing data representing information associated with a plurality of barcodes, said data representing different information for different barcodes;

detecting a barcode in the field of view of a barcode sensor mounted on said frame of said head mounted display system;

decoding a detected barcode; and controlling said display to depict different information in response to the decoding of different barcodes.

* * * * *